(12) United States Patent
Delin et al.

(10) Patent No.: US 11,385,093 B2
(45) Date of Patent: Jul. 12, 2022

(54) RADAR LEVEL GAUGING WITH POWER-DEPENDENT NUMBER OF MEASUREMENT OPERATIONS

(71) Applicant: Rosemount Tank Radar AB, Mölnlycke (SE)

(72) Inventors: Håkan Delin, Linköping (SE); Håkan Samor, Borensberg (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 155 days.

(21) Appl. No.: 16/871,445

(22) Filed: May 11, 2020

(65) Prior Publication Data
US 2020/0400480 A1 Dec. 24, 2020

(30) Foreign Application Priority Data
Jun. 19, 2019 (EP) .................................. 19181173

(51) Int. Cl.
*G01F 23/284* (2006.01)
*G01S 13/02* (2006.01)
*G01S 13/88* (2006.01)

(52) U.S. Cl.
CPC ............ *G01F 23/284* (2013.01); *G01S 13/02* (2013.01); *G01S 13/88* (2013.01)

(58) Field of Classification Search
None
See application file for complete search history.

(56) References Cited

U.S. PATENT DOCUMENTS

2013/0333465 A1* 12/2013 Nilsson .................... G01S 7/28
73/290 V
2015/0253175 A1 9/2015 Jirskog et al.
(Continued)

FOREIGN PATENT DOCUMENTS

DE  10 2017 210 383  12/2018

OTHER PUBLICATIONS

DE102017210383 translation (Year: 2017).*
European Search Report from European Application No. 19181173, dated Nov. 20, 2019.

*Primary Examiner* — Whitney Moore
(74) *Attorney, Agent, or Firm* — Westman, Champlin & Koehler, P.A.

(57) ABSTRACT

A radar level gauge system comprising a transceiver; a signal propagation arrangement power monitoring circuitry for determining a presently available power for operation of the radar level gauge system; and processing circuitry coupled to the transceiver and to the power monitoring circuitry, and configured to: acquire a measure indicative of the presently available power for operation of the radar level gauge system from the power monitoring circuitry; perform a set of measurement operations dependent on the presently available power for operation of the radar level gauge system, each measurement operation including controlling the transceiver to generate and transmit an electromagnetic transmit signal, to receive an electromagnetic reflection signal, and to form a measurement signal indicative of a timing relation between the transmit signal and the reflection signal; and determine the filling level based on the measurement signal formed in each of the measurement operations in the set of measurement operations.

15 Claims, 6 Drawing Sheets

(56) References Cited

U.S. PATENT DOCUMENTS

2015/0276462 A1 10/2015 Kleman
2018/0372526 A1 12/2018 Welle et al.

* cited by examiner

RADAR LEVEL GAUGING WITH POWER-DEPENDENT NUMBER OF MEASUREMENT OPERATIONS

CROSS-REFERENCE TO RELATED APPLICATION

This application claims priority to European Patent Application No. 19181173.6, filed on Jun. 19, 2019, the content of which is hereby incorporated by reference in its entirety.

TECHNICAL FIELD OF THE INVENTION

The present invention relates to a radar level gauge system, and to a method of determining the filling level of a product in a tank using a radar level gauge system.

TECHNICAL BACKGROUND

Radar level gauging is often used for determining the filling level of product in a tank. In some measurement situations, for example in the case of turbulence or foam on the surface of the product, it may be difficult to correctly determine the filling level.

In applications where power consumption of the radar level gauge system is not an issue, several measurement signals may be combined to improve the signal-to-noise ratio, and thereby provide for an improved filling level determination.

In applications where the supply of power is scarce and/or varying over time, such measurement signal combination has so far not been used, which means that the thus improved signal-to-noise ratio has not been available for such applications.

SUMMARY

In view of the above, a general object of the present invention is to provide for improved filling level determination, in particular for application in which power supply is scarce and/or varying over time.

Aspects of the present invention are based on the realization that the power presently available for operation of the radar level gauge system can be estimated, and that the number of measurement operations that are performed to determine the filling level can be adapted to the presently available power. Hereby, a beneficial trade-off between measurement quality and the ability to at all perform filling level measurements can be achieved at all times.

According to a first aspect of the present invention, it is provided a method of determining a filling level of a product in a tank using a radar level gauge system, the method comprising: determining a measure indicative of a presently available power for operation of the radar level gauge system; determining, based on the measure indicative of the presently available power for operation of the radar level gauge system, a maximum number of measurement operations to be performed for determination of the filling level; performing a set of measurement operations including a number of measurement operations that is less than or equal to the maximum number of measurement operations, each measurement operation including: generating and transmitting an electromagnetic transmit signal; propagating the transmit signal towards a surface of the product in the tank; receiving an electromagnetic reflection signal resulting from reflection of the transmit signal at the surface of the product; and forming a measurement signal indicative of a timing relation between the transmit signal and the reflection signal; and determining the filling level based on a set of measurement signals including the measurement signal formed in each of the measurement operations in the set of measurement operations.

According to a second aspect of the present invention, it is provided a radar level gauge system, for determining a filling level of a product in a tank, the radar level gauge system comprising: a transceiver for generating, transmitting and receiving electromagnetic signals; a signal propagation arrangement coupled to the transceiver for propagating an electromagnetic transmit signal towards a surface of the product and returning to the transceiver an electromagnetic reflection signal resulting from reflection of the transmit signal at the surface of the product; power monitoring circuitry for determining a measure indicative of a presently available power for operation of the radar level gauge system; and processing circuitry coupled to the transceiver and to the power monitoring circuitry, and configured to: acquire the measure indicative of a presently available power for operation of the radar level gauge system from the power monitoring circuitry; perform a set of measurement operations including a number of measurement operations being dependent on the presently available power for operation of the radar level gauge system, each measurement operation including controlling the transceiver to generate and transmit an electromagnetic transmit signal, to receive an electromagnetic reflection signal resulting from reflection of the transmit signal at a surface of the product, and to form a measurement signal indicative of a timing relation between the transmit signal and the reflection signal; and determine the filling level based on a set of measurement signals including the measurement signal formed in each of the measurement operations in the set of measurement operations.

In these aspects, the number of measurement operations involved in determining the filling level is adapted to the amount of power that is presently available for operation of the radar level gauge system. This provides for a favorable trade-off between power consumption and measurement performance of the radar level gauge system.

The tank may be any container or vessel capable of containing a product, and may be metallic, or partly or completely non-metallic, open, semi-open, or closed.

The "transceiver" may be one functional unit capable of transmitting and receiving electromagnetic signals or may be a system comprising separate transmitter and receiver units.

It should be noted that the processing circuitry may be provided as one device or several devices working together.

According to various embodiments, the radar level gauge system may comprise a local energy store; and the measure indicative of the presently available power for operation of the radar level gauge system may at least partly be determined by determining a measure indicative of an amount of energy presently stored in the local energy store.

The local energy store may, for example, include a battery and/or a capacitor and/or a super capacitor, etc.

The presently available power may be determined based on externally supplied power and on stored energy. If much energy is presently stored, more power can temporarily be used than is supplied.

According to embodiments, the radar level gauge system may be configured to be powered by a two-wire current loop and configured to provide an indication of the filling level by controlling the loop current flowing through the two-wire current loop. The measure indicative of the presently available power for operation of the radar level gauge system may then at least partly be based on a determined measure indicative of a voltage across the two-wire current loop.

In embodiments, the radar level gauge system may be configured to generate the transmit signal in the form of a measurement sweep across electromagnetic signal frequencies in a frequency band having a center frequency and a bandwidth. In such embodiments, the measurement signal may be a so-called intermediate frequency signal that can be formed by mixing the transmit signal with the reflection signal. Where the set of measurement operations comprises more than one measurement operation, the transmit signal in each measurement operation may be substantially identical, and thus exhibit measurement sweeps with the same properties (same center frequency and same bandwidth).

A combination, such as averaging, of measurement signals resulting from different measurement sweeps may advantageously be performed in the frequency domain, to make the combination of the measurement signals more robust in view of changes in the filling level between measurement sweeps.

To reduce the risk of measurement degradation due to movement of the surface during the time when the measurement operations in the set of measurement operations are performed, the transceiver may advantageously be configured to generate short measurement sweeps, with a short time between successive measurement sweeps. For instance, a sweep duration of the measurement sweeps may advantageously be less than 200 µs, and the time between successive measurement sweeps may advantageously be less than 50 µs. To achieve this, the transceiver may advantageously be provided in the form of a so-called radar on a chip, where the transceiver is realized on a single integrated circuit.

In such a single integrated circuit, the measurement signal(s) (in digital form) may be buffered (locally stored) in the single integrated circuit, and the calculations needed to determine the filling level based on the measurement signal(s) (such as a combination of several measurement signals) may take place after having completed the set of measurement operations. This allows for a shorter time between successive measurement operations, which in turn provides for efficient signal combination (such as averaging) even when the surface of the product is moving quickly.

Furthermore, the radar level gauge system according to various embodiments may advantageously be configured for intermittent operation. In such embodiments, the radar level gauge system may be controllable between an inactive state in which the filling level is not determined, and an active state in which the filling level is determined. The radar level gauge system may be controlled to transition from the inactive state to the active state. Thereafter, the radar level gauge system may be controlled to check the available power, and carry out a filling level determination involving a number of measurement operations that can be supported by the presently supplied power for operation of the radar level gauge system. After having provided a measure indicative of the filling level, the radar level gauge system may be transitioned back to the inactive state.

It should be noted that embodiments and variations of the various aspects of the present invention are largely analogous.

In summary, the present invention thus relates to a radar level gauge system comprising a transceiver; a signal propagation arrangement coupled to the transceiver; power monitoring circuitry for determining a measure indicative of a presently available power for operation of the radar level gauge system; and processing circuitry coupled to the transceiver and to the power monitoring circuitry, and configured to: acquire the measure indicative of a presently available power for operation of the radar level gauge system from the power monitoring circuitry; perform a set of measurement operations dependent on the presently available power for operation of the radar level gauge system, each measurement operation including controlling the transceiver to generate and transmit an electromagnetic transmit signal, to receive an electromagnetic reflection signal, and to form a measurement signal indicative of a timing relation between the transmit signal and the reflection signal; and determine the filling level based on the measurement signal formed in each of the measurement operations in the set of measurement operations.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, an exemplary embodiment of the radar level gauge system according to the present invention is discussed with reference to a non-contact radar level gauge system of the so-called FMCW-type that communicates via and is powered by a two-wire current loop. It should be noted that this by no means limits the scope of the present invention, which is equally applicable to other kinds of radar level gauge systems, such as guided wave radar level gauge systems, pulsed radar level gauge systems, or radar level gauge systems powered by other power sources with limited and varying supply, such as solar cells etc. Moreover, the two-wire current loop may be configured to function according to various communication standards, such as 4-20 mA, HART, Foundation Fieldbus, Profibus etc.

Figure 1:
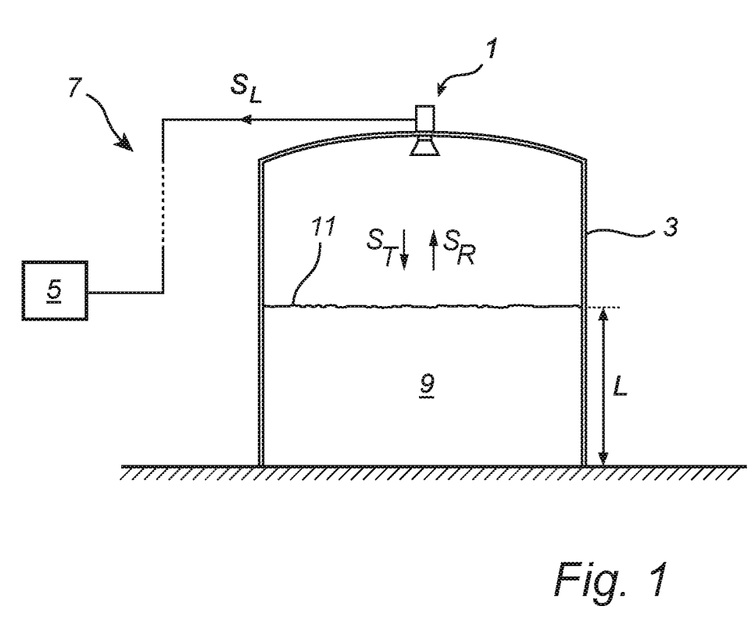
FIG. 1 schematically illustrates an exemplary tank arrangement comprising a radar level gauge system according to an embodiment of the present invention.

FIG. 1 schematically illustrates a radar level gauge 1 installed in an exemplary tank 3. The radar level gauge 1 is connected to a remote host/master 5 via a two-wire current loop 7, which is also used to provide power to the radar level gauge 1. The tank 3 contains a product 9, and when in operation, the radar level gauge 1 determines the filling level L of the product 9 in the tank 3 based on at least one electromagnetic transmit signal ST propagated towards the surface 11 of the product 9 and at least one electromagnetic reflection signal SR resulting from reflection of the transmit signal at the surface 11.

After having determined the filling level L, the radar level gauge system 1 provides a measurement signal $S_L$ indicative of the filling level L to the remote host/master 5 via the two-wire current loop 7. The provision of the measurement signal $S_L$ to the two-wire current loop 7, as well as the provision of power from the two-wire current loop 7 to the field device 1 will be described in some more detail below with reference to FIG. 2.

Figure 2:
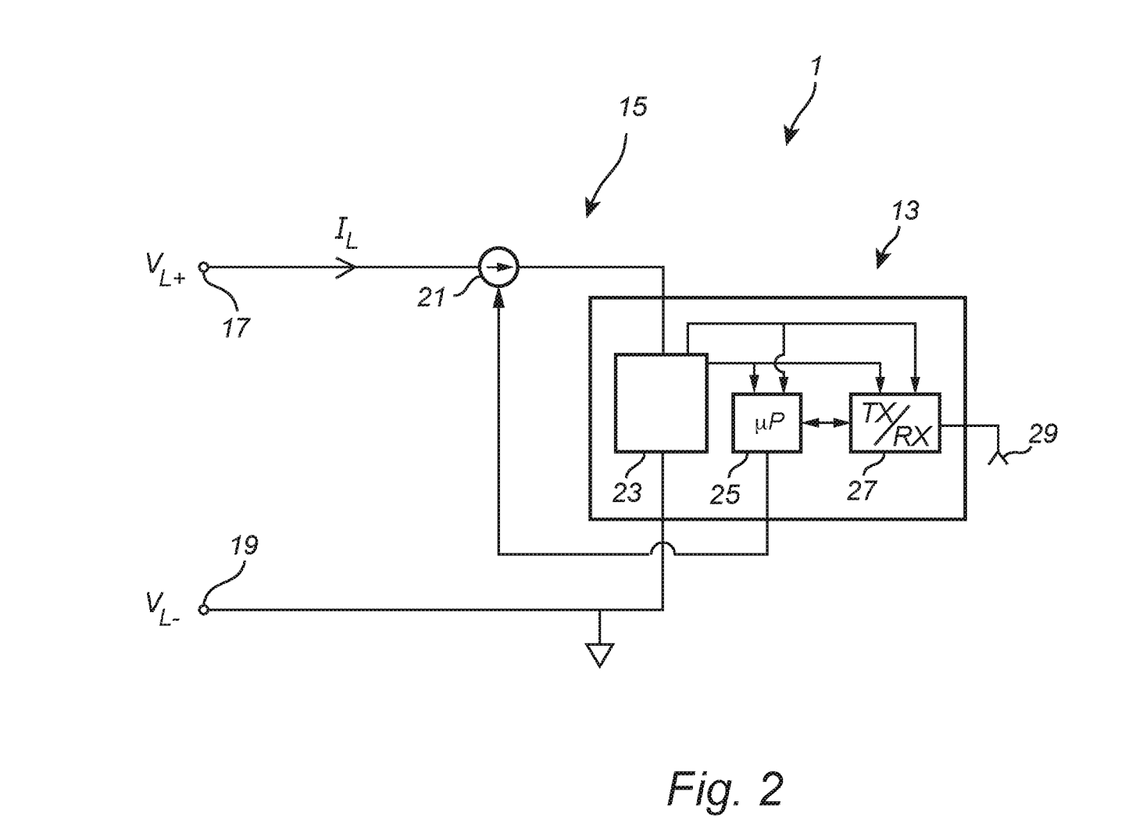
FIG. 2 is schematic illustration of the radar level gauge system in FIG. 1.

FIG. 2 is a block diagram schematically illustrating an exemplary embodiment of the radar level gauge system 1 according to the present invention. As will be apparent to one of ordinary skill in the art, the description of the configuration of the radar level gauge in FIG. 2 is somewhat simplified. As is schematically indicated in FIG. 2, the radar level gauge system 1 comprises measurement circuitry 13 for determining the above-mentioned filling level L, and loop interface circuitry 15 for providing a measurement signal $S_L$ (the loop current $I_L$) indicative of the filling level L to the two-wire current loop 7, and for providing power from the two-wire current loop 7 to the measurement circuitry 13.

The loop interface circuitry 15 comprises a first loop connector 17 for connection to a relatively high loop potential $V_{L+}$, and a second loop connector 19 for connection to a relatively low loop potential $V_{L-}$. As can be seen in FIG. 2, the loop interface circuitry 13 further comprises a controllable current source 21.

Starting from the first loop connector 17, the controllable current source 21 and the measurement circuitry 13 are connected in series, and form part of the two-wire current loop 7 when the radar level gauge system 1 is connected to the current loop 7 at the first 17 and second 19 loop connectors.

The measurement circuitry 13 of the radar level gauge system 1 comprises loop voltage monitoring and conversion circuitry 23, processing circuitry indicated as a microprocessor 25, and a transceiver 27. The transceiver 27 is connected to a signal propagation arrangement, here indicated as a schematic antenna 29 for transmitting and receiving microwave signals.

The loop voltage monitoring and conversion circuitry 23 is connected to the loop interface circuitry 15 for receiving power from the two-wire current loop 7. As is indicated in FIG. 2, the loop voltage monitoring and conversion circuitry 23 provides power from the two-wire current loop 7 to the processing circuitry 25 and to the transceiver 27. In addition, the loop voltage monitoring and conversion circuitry 23 provides a measure $V_L$ indicative of the loop voltage to the processing circuitry 25. The processing circuitry 25 controls operation of the transceiver 27, and determines the filling level L of the product 9 in the tank 3 (referring to FIG. 1) based on the microwave signals transmitted towards the surface 11 and the microwave signals reflected from the surface 11. Additionally, the processing circuitry 25 determines a desired loop current $I_L$ corresponding to the filling level L and provides a signal indicative of this desired loop current to the current regulator 21 as is schematically indicated in FIG. 2. The processing circuitry also acquires the above-mentioned measure $V_L$ indicative of the loop voltage from the loop voltage monitoring and conversion circuitry 23 and determines a maximum number of measurement operations on which to base the filling level determination. This will be described in greater detail further below.

Figure 3:
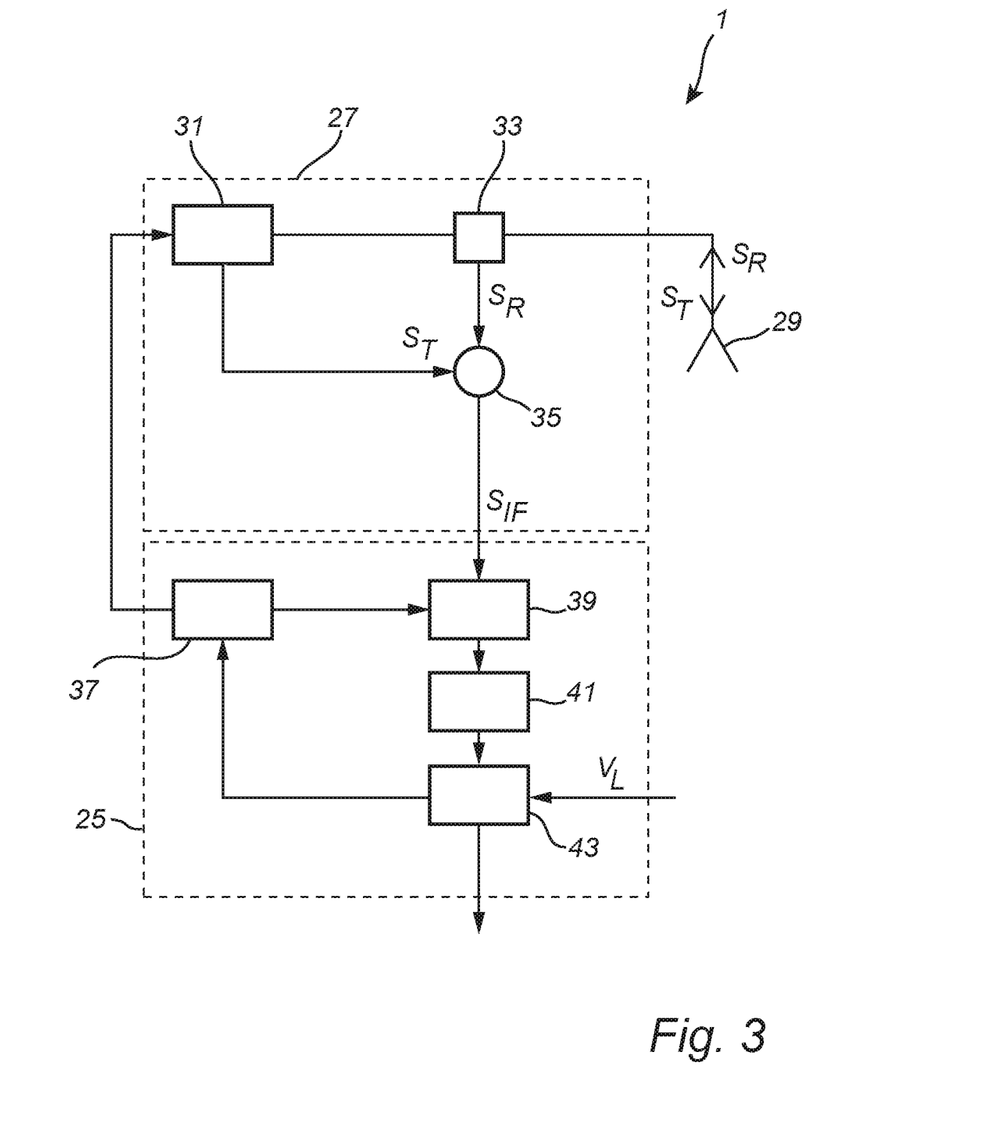
FIG. 3 is a schematic block diagram of the transceiver and measurement processor comprised in a radar level gauge system according to an embodiment of the present invention.

FIG. 3 is a partial and simplified schematic block diagram of the radar level gauge system 1 in FIG. 2. The block diagram in FIG. 3 shows a measurement channel comprising the transceiver 27, the antenna 29, and the processing circuitry 25 in FIG. 2.

The transceiver 27 is here shown as including a microwave source 31, a power divider 33, and a mixer 35. The processing circuitry 25 is shown as including timing circuitry 37, a sampler 39, an FFT block 41, and a processing and control block 43.

As is schematically indicated in FIG. 3, the timing circuitry 37 is coupled to the microwave source 31 to control the microwave source 31 to generate a transmit signal $S_T$. The microwave source 31 is connected to the antenna 29 via the power divider 33, and thus provides the transmit signal $S_T$ to the antenna 29. The reflection signal $S_R$ from the antenna 29 is routed by the power divider 33 to the mixer 35, which is also connected to receive the transmit signal $S_T$ signal from the microwave source 31. The transmit signal $S_T$ provided by the microwave source 31 and the reflection signal $S_R$ from the antenna 29 are combined in the mixer 35 to form an intermediate frequency signal $S_{IF}$.

As is schematically shown in FIG. 3, the intermediate frequency signal $S_{IF}$ is sampled by the sampler 39, which may be controlled by the timing circuitry 37 to be synchronized with the transmit signal $S_T$. The sampled intermediate frequency signal $S_{IF}$ is further processed by the FFT-block 41.

As is schematically indicated in FIG. 3, the processing and control block 43 receives, for example from the loop voltage monitoring and conversion circuitry 23 in FIG. 2, an indication of the presently available power for operation of the radar level gauge system 1 and controls operation of the radar level gauge system 1 at least partly based on this indication.

While the elements of the transceiver 27 are typically implemented in hardware, and form part of an integrated unit normally referred to as a microwave unit, at least some portions of the processing circuitry 25 may typically be embodied by software modules executed by an embedded processor. The invention is not restricted to this particular realization, and any implementation found suitable to realize the herein described functionality may be contemplated. In particular, the transceiver 27 and the processing circuitry 25 may advantageously be realized as a single component—a so-called Radar-On-A-Chip (ROAC). Such a configuration may be particularly useful in embodiments of the present invention, since a ROAC may be capable of achieving fast frequency sweeps and a short time between successive frequency sweeps.

Figure 4:
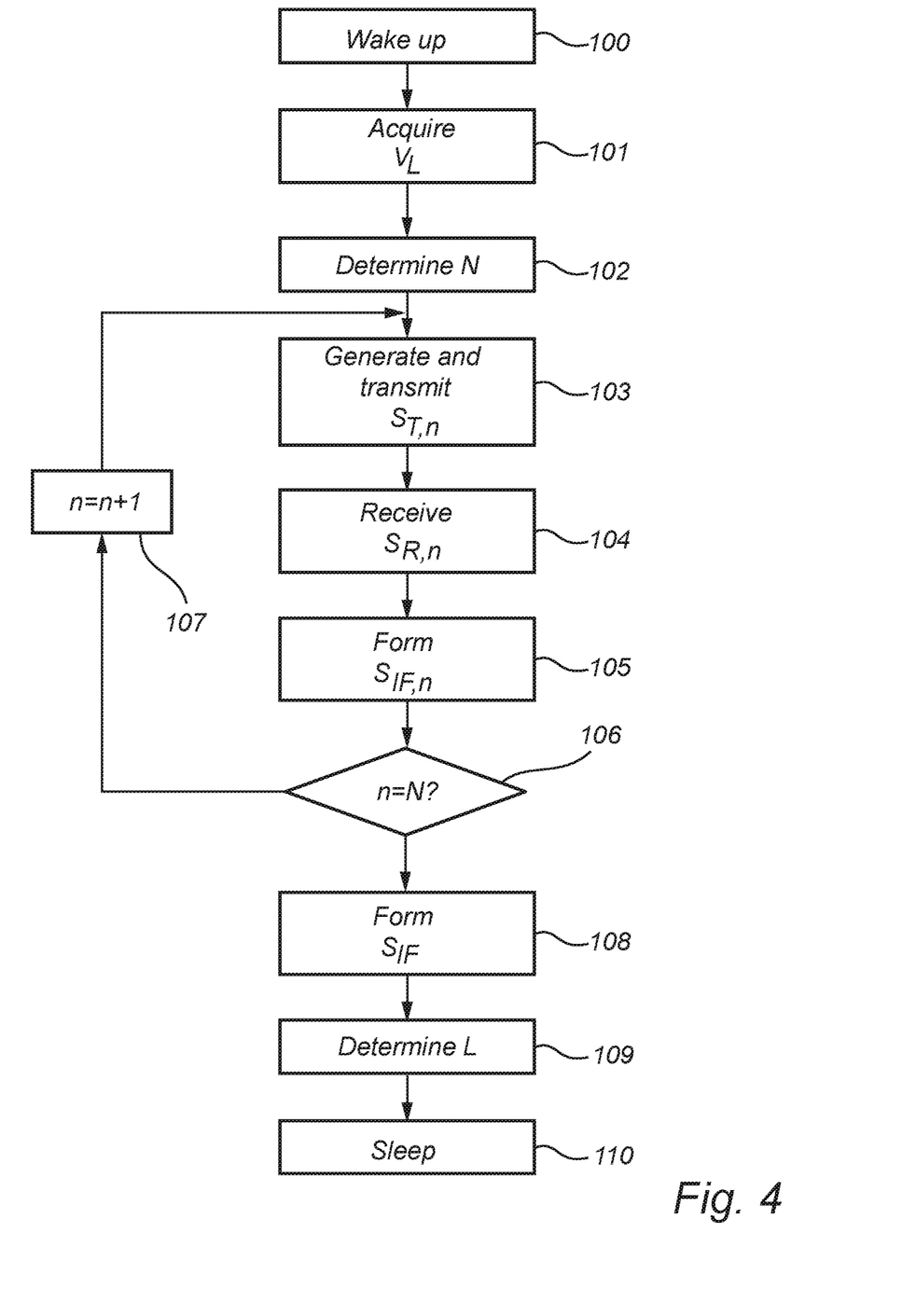
FIG. 4 is a flow-chart schematically illustrating example embodiments of the method according to the present invention.

An example embodiment of the method according to the present invention will now be described with reference to the flow-chart in FIG. 4. In a first step 100, the radar level gauge system 1 is transitioned from an inactive state in which the filling level L is not determined, to an active state in which the filling level L is determined. The radar level gauge system 1 has a lower power consumption in the inactive state than in the active state, resulting in a lower average power consumption over time. This is often referred to as intermittent operation, and is schematically illustrated in FIG. 5.

Figure 5:
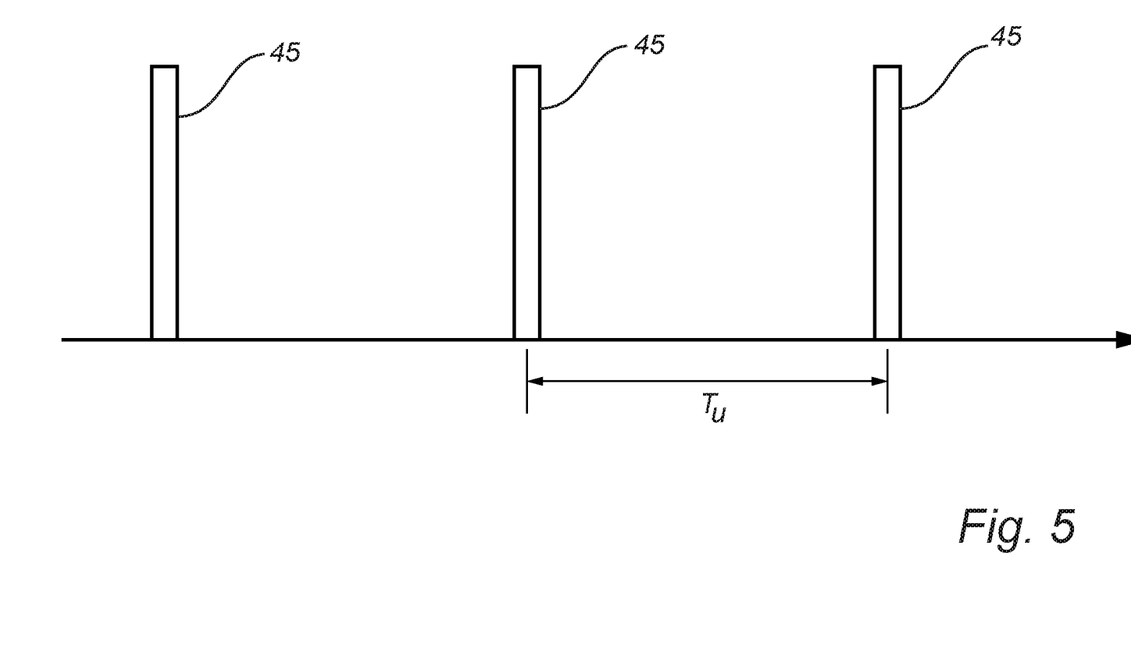
FIG. 5 is a schematic illustration of intermittent operation of the radar level gauge system.

Turning briefly to FIG. 5, active periods, collectively denoted by reference numeral 45, are relatively short and are separated by a measurement update time $T_u$. As will be known to the skilled person, the transitioning between the active and inactive states may be externally controlled, for example by the remote host/master 5, or by timing circuitry (not shown) internally to the radar level gauge system 1.

When the radar level gauge system has been transitioned to the active state, the method proceeds to step 101, in which a measure indicative of a presently available power for operation of the radar level gauge system 1 is determined. Referring to FIG. 2 and FIG. 3, the measure indicative of the presently available power for operation of the radar level gauge system 1 may, for example, include the loop voltage $V_L$ and the loop current $I_L$. The loop current $I_L$ is controlled by the processing circuitry 25 of the radar level gauge system 1 as was described further above, and the loop voltage may be measured by the loop voltage monitoring and conversion circuitry 23. In embodiments where the radar level gauge system 1 includes energy storage circuitry, such as a capacitor, the charge stored by such a capacitor may also be a basis for the determination of the measure indicative of the presently available power for operation of the radar level gauge system 1.

In the next step 102, a number N of measurement operations to be performed for determination of the filling level L is determined based on the measure indicative of the presently available power for operation of the radar level gauge system 1. This number N of measurement operations may correspond to the number of measurement operations that the radar level gauge system 1 can "afford" to perform in view of the presently available power. In some embodiments, the radar level gauge system may be configured not to utilize all of the available measurement operations in all measurement situations, for example fewer measurement operations may be carried out if it is known that the measurement conditions are favorable. In other embodiments, the radar level gauge system 1 may be configured to always perform the number N of measurement operations in order to provide the best possible measurement quality at all times, in view of the presently available power for operation of the radar level gauge system 1.

In step 103, which is the first step in measurement operation number n, a transmit signal $S_{T,n}$ is generated and transmitted. The reflection signal $S_{R,n}$ resulting from reflection of the transmit signal $S_{T,n}$ at the surface 11 of the product 9 in the tank 3 is received in step 104.

In the subsequent step 105, a measurement signal indicative of a timing relation between the transmit signal $S_{T,n}$ and the reflection signal $S_{R,n}$ is formed. For example the measurement signal may be an intermediate frequency signal $S_{IF,n}$ formed by mixing the transmit signal $S_{T,n}$ and the reflection signal $S_{R,n}$, by the mixer 35 in FIG. 3.

In the next step 106, it is determined if all measurement operations in the set of measurement operations have been performed. If this is not the case, the method proceeds to step 107 and increments a counter, and then returns to step 103 and starts a new measurement operation in the set of measurement operations.

If it is instead determined in step 106 that all measurement operations in the set of measurement operations have been performed, in this case N measurement operations, the method proceeds to step 108, in which a combined measurement signal $S_{IF}$ is formed based the measurement signals formed in each of the measurement operations. For instance, the combined measurement signal $S_{IF}$ may be formed by averaging the measurement signal $S_{IF,n}$ formed in each measurement operation, using per se known averaging methods. As is well known to those of ordinary skill in the art, this combination, for example averaging, can provide for a reduced signal-to-noise ratio. This will, in turn, make it easier to distinguish reflections from a product surface giving a relatively weak reflection signal. This may be the case for a turbulent product surface or a product surface with foam. As was mentioned further above, the combination of measurement signals (such as averaging) may advantageously take place in the frequency domain, that is, after processing by the FFT-block 41 in FIG. 3.

In the subsequent step 109, the filling level is determined based on the set of measurement signals. For example, the filling level L may advantageously be determined, using the processing and control block 43 of the processing circuitry 25, based on the combined measurement signal $S_{IF}$ determined in step 108.

Finally, in step 110, the radar level gauge system 1 is transitioned to its inactive state, after having provided a measure indicative of the filling level to the host 5.

In embodiments of this method, the filling level determination may be based on different numbers of measurement operations, such as measurement frequency sweeps, depending on the presently available power for operation of the radar level gauge system 1. This means that the measurement quality that can be achieved by the radar level gauge is adaptively maximized in view of the available power.

Figure 6A:
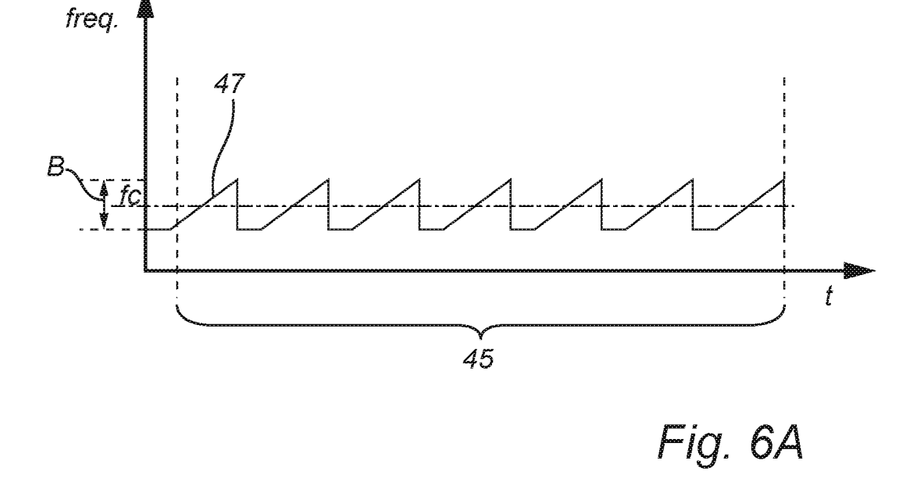
FIGS. 6A-B schematically illustrate examples of sets of measurement operations carried out when different amounts of power are available for operation of the radar level gauge system.
Figure 6B:
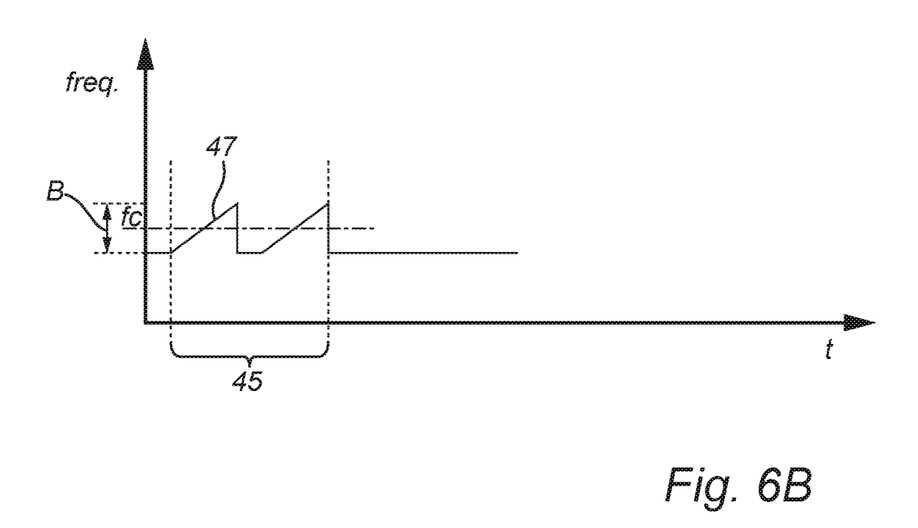

FIGS. 6A-B schematically indicate two different numbers of measurement operations performed during an active period 45.

In FIG. 6A a situation is illustrated in which there is relatively much power available for operation of the radar level gauge system 1. For example, for a loop-powered radar level gauge system 1, the loop voltage $V_L$ may be relatively high and/or the loop current may be relatively high. This means that the present power budget allows for a relatively large number of measurement operations, schematically illustrated by FMCW-type frequency sweeps 47 in FIG. 6A.

In FIG. 6B a situation is illustrated in which there is relatively little power available for operation of the radar level gauge system 1. For example, for a loop-powered radar level gauge system 1, the loop voltage $V_L$ may be relatively low and/or the loop current may be relatively low. This means that the present power budget allows for a relatively small number of measurement operations, schematically illustrated by FMCW-type frequency sweeps 47 in FIG. 6B. It should be noted that each measurement sweep 47 in FIGS. 6A-B exhibit the same center frequency $f_c$ and bandwidth B.

The person skilled in the art realizes that the present invention by no means is limited to the preferred embodiments described above. On the contrary, many modifications and variations are possible within the scope of the appended claims.

What is claimed is:

1. A method of determining a filling level of a product in a tank using a radar level gauge system, the method comprising:

determining a measure indicative of a presently available power for operation of the radar level gauge system;

determining, based on the measure indicative of the presently available power for operation of the radar level gauge system, a maximum number of measurement operations to be performed for determination of the filling level;

performing a set of measurement operations including a number of measurement operations that is less than or equal to the maximum number of measurement operations, each measurement operation including:

generating and transmitting an electromagnetic transmit signal;

propagating the transmit signal towards a surface of the product in the tank;

receiving an electromagnetic reflection signal resulting from reflection of the transmit signal at the surface of the product; and forming a measurement signal indicative of a timing relation between the transmit signal and the reflection signal; and determining the filling level based on a set of measurement signals including the measurement signal formed in each measurement operation in the set of measurement operations.

2. The method according to claim 1, wherein:

the radar level gauge system comprises a local energy store; and the step of determining the measure indicative of the presently available power for operation of the radar level gauge system comprises determining a measure indicative of an amount of energy presently stored in the local energy store.

3. The method according to claim 1, wherein:

the radar level gauge system is configured to be powered by a two-wire current loop and configured to provide an indication of the filling level by controlling the loop current flowing through the two-wire current loop; and the step of determining the measure indicative of the presently available power for operation of the radar level gauge system comprises determining a measure indicative of a voltage across the two-wire current loop.

4. The method according to claim 3, wherein:

the radar level gauge system is configured to provide the indication of the filling level by controlling the loop current to exhibit a predefined DC-current component corresponding to the filling level; and the measure indicative of the presently available power for operation of the radar level gauge system is further based on the predefined DC-current.

5. The method according to claim 1, wherein the step of determining the filling level comprises averaging the set of measurement signals to form an averaged measurement signal, and determining the filling level based on the averaged measurement signal.

6. The method according to claim 1, wherein the transmit signal is a measurement sweep across electromagnetic signal frequencies in a frequency band having a center frequency and a bandwidth.

7. The method according to claim 6, wherein the measurement signal is an intermediate frequency signal formed by mixing the transmit signal with the reflection signal.

8. The method according to claim 1, wherein the number of measurement operations in the set of measurement operations is additionally based on a previous filling level measurement.

9. A method of intermittently operating a radar level gauge system controllable between an inactive state in which the filling level is not determined, and an active state in which the filling level is determined, the method comprising:

controlling the radar level gauge system to transition from the inactive state to the active state;

controlling, after having transitioned the radar level gauge system to the active state, the radar level gauge system to perform the steps according to claim 1; and controlling the radar level gauge system to transition from the active state to the inactive state.

10. A radar level gauge system, for determining a filling level of a product in a tank, the radar level gauge system comprising:

a transceiver for generating, transmitting and receiving electromagnetic signals;

a signal propagation arrangement coupled to the transceiver for propagating an electromagnetic transmit signal towards a surface of the product and returning to the transceiver an electromagnetic reflection signal resulting from reflection of the transmit signal at the surface of the product;

power monitoring circuitry for determining a measure indicative of a presently available power for operation of the radar level gauge system; and processing circuitry coupled to the transceiver and to the power monitoring circuitry, and configured to:

acquire the measure indicative of a presently available power for operation of the radar level gauge system from the power monitoring circuitry;

perform a set of measurement operations including a number of measurement operations being dependent on the presently available power for operation of the radar level gauge system, each measurement operation including controlling the transceiver to generate and transmit an electromagnetic transmit signal, to receive an electromagnetic reflection signal resulting from reflection of the transmit signal at a surface of the product, and to form a measurement signal indicative of a timing relation between the transmit signal and the reflection signal; and determine the filling level based on a set of measurement signals including the measurement signal formed in each measurement operation in the set of measurement operations.

11. The radar level gauge system according to claim 10, wherein:

the radar level gauge system further comprises a local energy store; and the power monitoring circuitry is configured to determine a measure indicative of an amount of energy presently stored in the local energy store.

12. The radar level gauge system according to claim 10, wherein the radar level gauge system comprises:

a first loop connector for connection to a first loop potential of a two-wire current loop and a second loop connector for connection to a second loop potential of the two-wire current loop, a current loop voltage being an absolute difference between the first loop potential and the second loop potential; and loop-current control circuitry controllable by the processing circuitry to set a loop-current flowing through the two-wire current loop to a predefined value dependent on the determined filling level, wherein the number of measurement operations in the set of measurement operations performed by the processing circuitry depends on the current loop voltage and the loop-current.

13. The radar level gauge system according to claim 10, wherein the transceiver comprises:

a measurement sweep generator configured to generate the transmit signal in the form of a measurement sweep across electromagnetic signal frequencies in a frequency band having a center frequency and a bandwidth; and a mixer connected to the measurement sweep generator and to the signal propagation arrangement for mixing the transmit signal and the reflection to form the measurement signal in each measurement operation.

14. The radar level gauge system according to claim 13, wherein the measurement sweep generator is configured to generate the measurement sweep with a sweep duration of less than 200 μs.

15. The radar level gauge system according to claim 14, wherein the measurement sweep generator is configured to generate measurement sweeps in successive measurement operations with less than 50 μs between an end of a first measurement sweep and a beginning of a second, subsequent, measurement sweep.

* * * * *